United States Patent [19]
Fujiwara et al.

[11] Patent Number: 4,786,011
[45] Date of Patent: Nov. 22, 1988

[54] LOADING DEVICE FOR DIRECTING A TAPE-LIKE ELEMENT FROM A SUPPLY REEL TO A TAKE-UP REEL AND ABOUT A GUIDE DRUM THEREBETWEEN

[75] Inventors: Jiro Fujiwara; Yoshiaki Sugiyama; Hisayoshi Chino, all of Kanagawa; Hiroaki Ohishi, Tokyo, all of Japan

[73] Assignee: Sony Corporation, Tokyo, Japan

[21] Appl. No.: 134,876

[22] Filed: Dec. 18, 1987

[30] Foreign Application Priority Data

Dec. 26, 1986 [JP] Japan .................................. 61-310266
Dec. 26, 1986 [JP] Japan .................................. 61-310268
Jan. 24, 1987 [JP] Japan .............................. 62-008895[U]

[51] Int. Cl.$^4$ ..................... G11B 15/32; G11B 5/027
[52] U.S. Cl. ...................................... 242/195; 360/84; 360/130.21; 360/130.24
[58] Field of Search .............. 242/195, 57, 201–203; 360/128, 129, 84, 130.21, 130.24, 90, 93, 96.1; 226/91, 97

[56] References Cited

U.S. PATENT DOCUMENTS

| | | | |
|---|---|---|---|
| 3,911,490 | 10/1975 | Kostin et al. | 360/129 |
| 4,520,970 | 6/1985 | Rasmussen et al. | 242/195 |
| 4,571,654 | 2/1986 | Oishi | 360/130.21 |
| 4,620,678 | 11/1986 | Kumakura et al. | 242/195 |
| 4,726,542 | 2/1988 | Nakayama et al. | 242/57 X |

Primary Examiner—David Werner
Attorney, Agent, or Firm—Alvin Sinderbrand

[57] ABSTRACT

In a device for loading a tape-like element, such as, a magnetic tape, film or the like, in an apparatus having supply and take-up reels which are disposed side-by-side with their axes substantially horizontal in a normal operating position of the apparatus, and a guide drum located under the supply reel in such normal operating position; a generally zig-zag path for the tape-like element is provided with an inlet adjacent the supply reel for receiving the tape-like element paid out from the latter and an outlet arranged near to the take-up reel, such path includes a supply side path portion extending from the inlet to a peripheral path portion around at least a part of the periphery of the guide drum and a take-up side path portion extending from the peripheral path portion to the outlet, the supply side, peripheral and take-up path portions have respective lower wall sections facing upwardly in the normal operating position of the apparatus, and air under pressure is introduced into the path of the tape-like element along such upwardly facing lower wall sections for readily conveying the tape-like element along the described path.

15 Claims, 13 Drawing Sheets

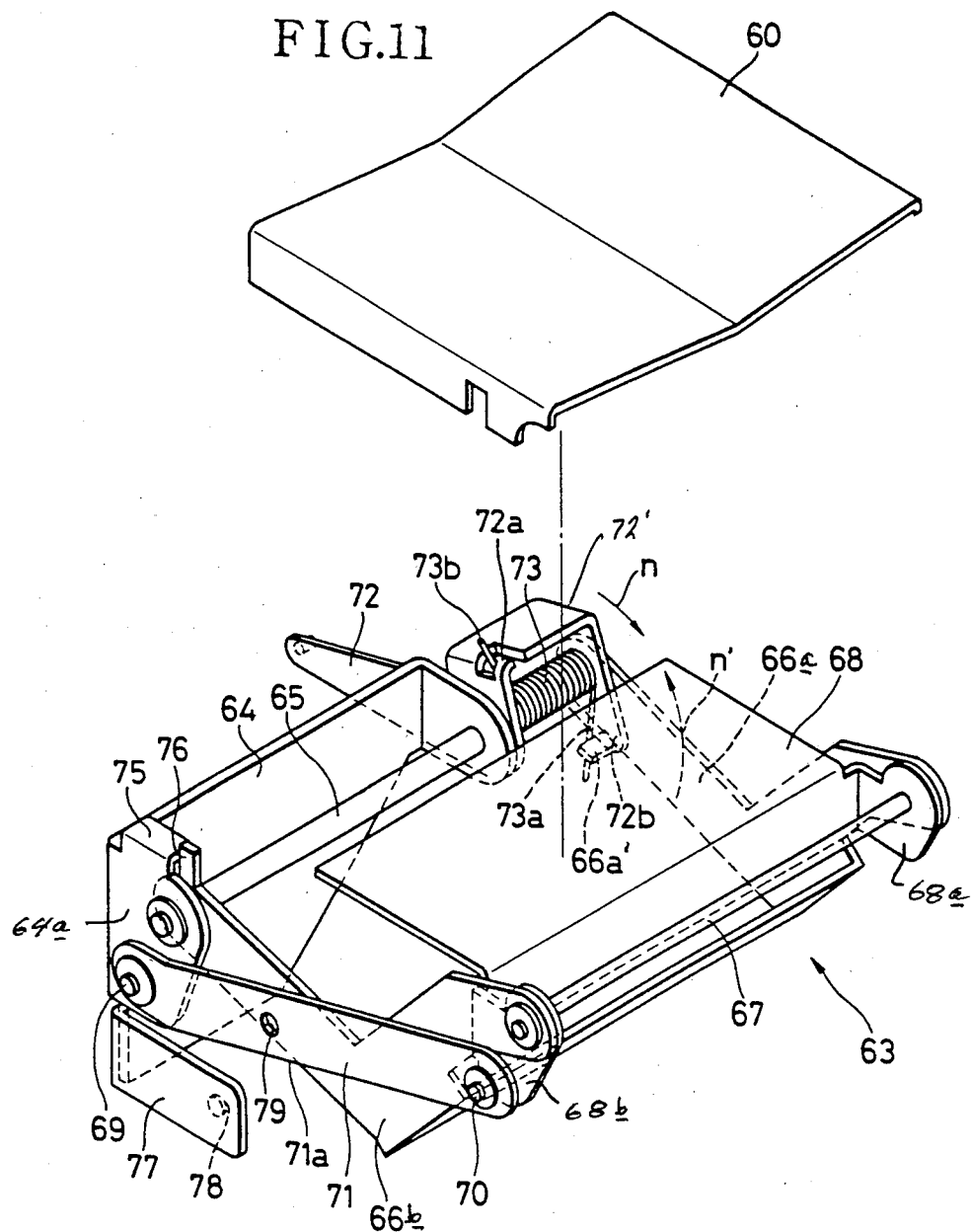

LOADING DEVICE FOR DIRECTING A TAPE-LIKE ELEMENT FROM A SUPPLY REEL TO A TAKE-UP REEL AND ABOUT A GUIDE DRUM THEREBETWEEN

BACKGROUND OF THE INVENTION

1. Field of the Invention

This invention relates generally to a device for loading a tape-like element, such as, a magnetic tape, film or the like, about a guide drum between supply and take-up reels, and more particularly is directed to a tape loading device suited for use in an open reel tape recording and/or reproducing apparatus.

2. Description of the Prior Art

It is already known to provide a tape recording and/or reproducing apparatus with a loading device by which a tape or similar element is automatically conveyed by air under pressure through a predetermined tape path extending from a supply reel to a take-up reel. For example, in U.S. Pat. Nos. 3,127,120, 3,134,527 and 4,243,186, tape loading devices are disclosed which include a duct defining a tape path between a supply reel and a tape-up reel, with an end portion of the tape-like element being conveyed through the duct by a flow of air through the latter in the direction toward the take-up reel. However, in such a loading device, it is difficult to smoothly convey the tape-like element unless the peripheries of the reels, as well as the path defined by the air duct, are enclosed in a substantially air-tight manner. The duct providing such air-tight enclosure of the path for the tape-like element becomes relatively large and complex so that the loading device occupies an undesirably large space as compared with the structures for performing the essential functions of the apparatus, such as, the recording and/or reproducing operations. Further, if the peripheries of the supply and take-up reels are enclosed in an air-tight manner, exchanging of the reels becomes difficult.

On the other hand, if the path for the tape-like element between the supply and take-up reels and the peripheries of such reels are not enclosed in a perfectly air-tight manner in an effort to keep the apparatus relatively compact, a more powerful blower is needed for producing the requisite air flows, so that the more powerful and hence larger blower at least somewhat defeats the attempt to reduce the over all size of the apparatus and, furthermore, electric power consumption is increased.

It is further known, for example, as disclosed in U.S. Pat. No. 3,863,863, to provide a tape loading device in which a take-up reel is arranged below a supply reel so that the travel of the tape from the take-up reel to the supply reel is assisted by the force of gravity which thereby reduces the demands placed on the flow of air in conveying the tape from the supply reel to the take-up reel. Further, in U.S. Pat. No. 3,334,831, it is disclosed to provide an air stream between a tape and a tape guide surface so that the tape is, in affect, suspended or floating on the air stream for reducing the extent to which the tape path needs to be enclosed in an air-tight manner, However, these last mentioned tape loading devices are provided in apparatus with simple stationery heads, and it is difficult to includes such tape loading devices in apparatus, such as, VTRs, employing rotary heads so that the tape path is complicated by the need to at least partly wrap the tape about the periphery of the guide drum associated with the rotary heads.

OBJECTS AND SUMMARY OF THE INVENTION

Accordingly, it is an object of the present invention to provide a loading device for loading a tape-like element in an apparatus having supply and take-up reels, and which avoids the above mentioned disadvantages of the tape loading devices according to the prior art.

More specifically, it is an object of this invention to provide a loading device for a tape-like element in an apparatus having supply and take-up reels, and in which the transporting of the tape-like element from the supply reel to the take-up reel during a loading operation is effected by air under pressure which is provided by a relatively small blower, thereby to permit reduction of the overall size of the apparatus and the consumption of electric power by the blower.

Another object of this invention is to provide a loading device, as aforesaid, in which the conveying of the tape-like element from the supply reel to the take-up reel is reliably affected by a flow of air under pressure from a relatively small blower without the need to effect air-tight enclosure of either the peripheries of the reels or the path of the tape.

It is still another object of the present invention to provide a device for loading a tape-like element in an apparatus having supply and take-up reels which are disposed side-by side with their axes substantially horizontal and with a guide drum disposed under the supply reel in a normal operating position of the apparatus, and in which a generally zia-zag path for the tape is defined below the reels and includes substantially horizontal path sections having lower wall sections facing upwardly in the normal operating position and through which air under pressure is introduced to flow along the lower wall sections for easily conveying the tape-like element. Further, by reason of the zig-zag tape path which, at one of its turns, wraps around a part of the periphery of the guide drum, the space below the supply and take-up reels is efficiently utilized for permitting reduction of the overall size of the apparatus.

A further object is to provide a loading device, as aforesaid, in which the structure defining the path for the tape-like element provides an opening along one side of such path through which access may be had to the tape-like element therein, and a movably mounted cover is provided to close the opening along said one side of the path, and further in which each of the lower wall sections having an upstanding guide fence extending therealong at the side of the path provided with the opening so that inadvertent entry of the tape-like element into a gap between the movably mounted cover and the lower wall sections is prevented. Further, the guide fences are formed integrally with members forming the tape path thereby simplifying the construction of the loading device and reducing the cost thereof.

A further object of the invention is to provide a loading device, as aforesaid, which ensures the proper positioning of the tape-like element about the guide drum even when the loading operation is performed with the apparatus somewhat inclined from its normal operating position. In this respect, a drum fence protrudes from the periphery of the guide drum substantially along a tape lead recessed in such periphery so that, during a loading operation in which the tape-like element is conveyed by a flow of air under pressure about the periphery of the guide durm, the drum fence ensures the positioning of the tape-like element so as to be thereafter engageable with the tape lead during the operation of the apparatus. As a result, during a recording or reproducing operation of the apparatus, the tape-like element is accurately guided by the tape lead to ensure accurate recording or reproducing, and further to prevent damage to the tape-like element.

Still a further object of the present invention is to provide a loading device, as aforesaid, in which a shield plate is movable between a shielding position adjacent to magnetic heads for magnetically shielding the latter during a recording or reproducing operation of the apparatus, and a position spaced from the heads in which the shield plate is flush with a wall section of the structure defining the tape path so as to avoid interference with the conveying of the tape during a loading operation.

It is still another object of the invention to provide a loading device, as aforesaid, in which the magnetic shield plate is also selectively movable to a position further removed from the magnetic heads so as to facilitate the cleaning and maintenance of the latter.

In accordance with an aspect of this invention, a loading device for loading a tape-like element in an apparatus having supply and take-up reels which are disposed side-by-side with their axes substantially horizontal in a normal operating position of the apparatus and a guide drum under the supply reel, comprises means defining a path for the tape-like element and having an inlet adjacent the supply reel for receiving the tape-like element paid out from the latter and an outlet arranged near to the take-up reel, such path including a peripheral path portion extending around at least part of the periphery of the guide drum, a supply side path portion extending from the inlet to the peripheral path portion and a take-up side path portion extending from the peripheral path portion to the outlet, such supply side, peripheral and take-up path portions having respective lower wall sections facing upwardly in the normal operating position; a plurality of air outlets opening at the lower wall sections of the supply side, peripheral and take-up path portions, respectively, for directing air under pressure into said path along the respective lower wall sections; and additional outlet opening at the lower wall section of the supply side path portion near to the peripheral path portion for directing air under pressure into the peripheral path portion; and blower means operative for supplying air under pressure to the plurality of air outlets and the additional air outlet so that the tape-like element paid out from the supply reel is conveyed by air under pressure issuing from said plurality of air outlets and is wound about said guide drum by air under pressure issuing from said additional air outlet for transporting of the tape-like element from said inlet to said outlet of the path.

The above, and other objects, features and advantages of this invention, will be apparent from the following detailed description of an illustrative embodiment when read in connection with the accompanying drawings, in which the same reference numerals are employed for identifying corresponding parts in the several views.

BRIEF DESCRIPTION OF THE DRAWINGS

FIG. 11 is a partly exploded perspective view of a movable mounting assembly for the magnetic shield plate.

DETAILED DESCRIPTION OF A PREFERRED EMBODIMENT

Figure 1:
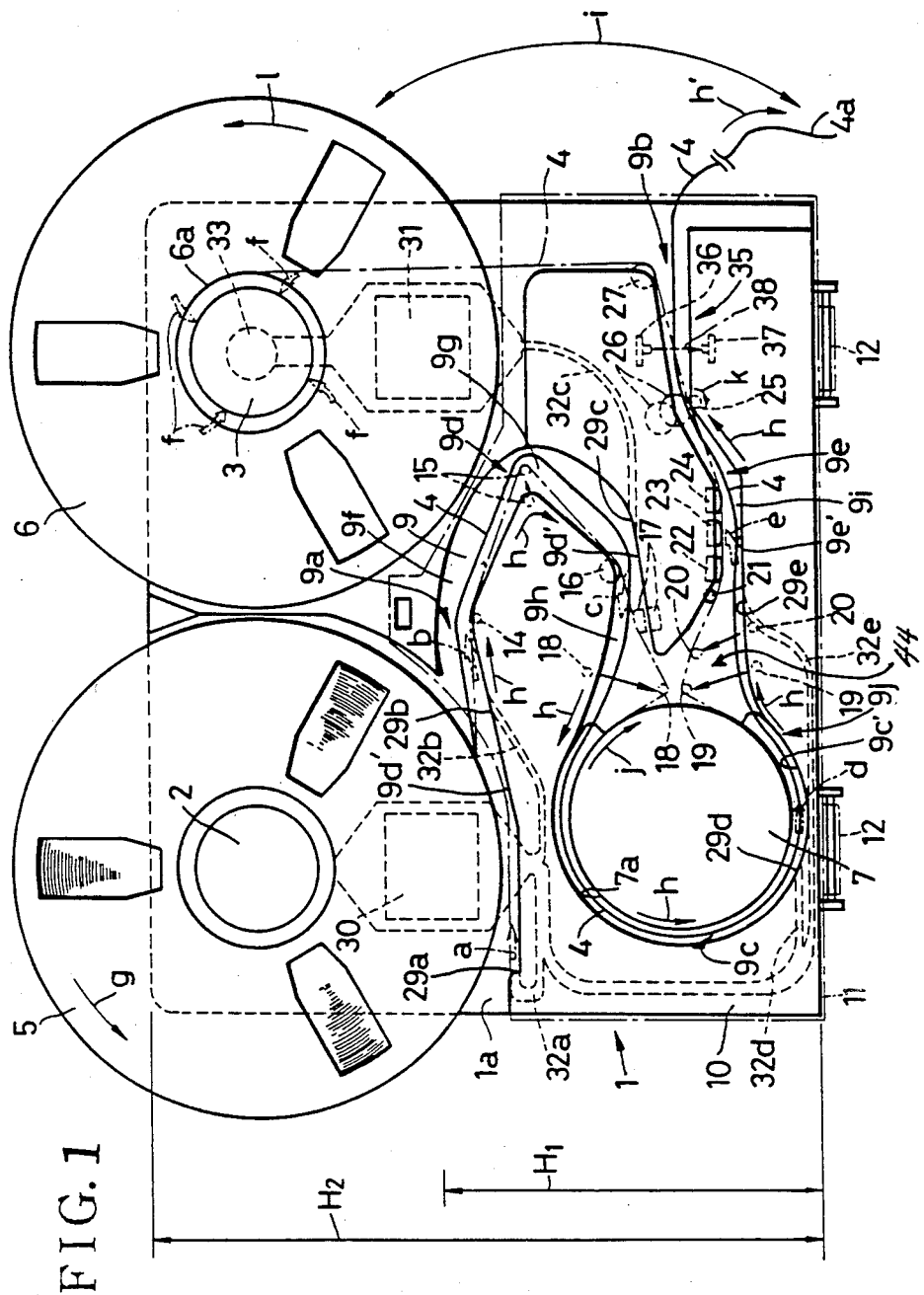
FIG. 1 is a front elevational view of a loading device according to an embodiment of this invention which is shown incorporated in a helical-scan video tape recorder of the open-reel type.
Figure 2:
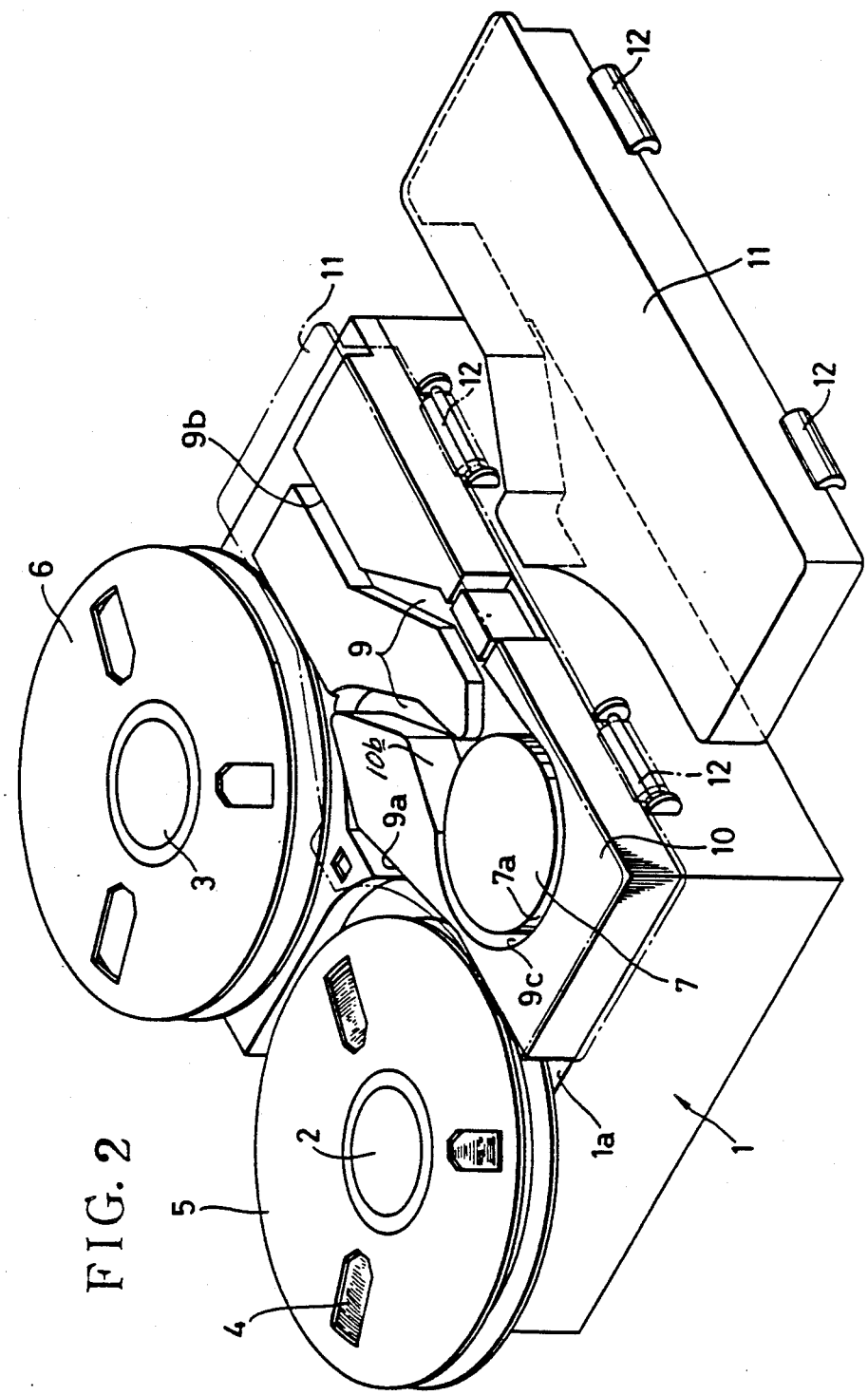
FIG. 2 is a perspective view of the video tape recorder of FIG. 1, but shown laid down on the back surface of its casing.

Referring initially to FIGS. 1 and 2, it will be said that a helical-scan video tape recorder (VTR) of the open-reel type which is adapted to be provided with a loading device according to an embodiment of this invention generally includes a main body or casing 1 which is normally vertically positioned, as shown on FIG. 1, and which has a rotary supply reel base 2 and a rotary take-up reel base 3 directed forwardly from the upper right and left corner portions of a front surface 1a of the body 1. A supply of magnetic tape 4 is wound around an open supply reel 5 which is removably mounted on, and rotatable with the supply reel base 2, and an open take-up reel 6 for taking up the magnetic tape 4 is smilarly mounted on, and rotatable with the take-up reel base 3. A rotary head guide drum 7 extends from the front surface 1a of the VTR main body 1 at a position under the supply reel 5, and a tape path 9 of generally zig-zag configuration is formed at the front of the body 1 below the reels 5 and 6.

The tape path 9 has an inlet 9a near the supply reel 5 and an outlet 9b spaced downwardly from the take-up reel 6 at the same side of the main body 1 as the take-up reel. The tape path 9 is shown to include a peripheral path portion 9c extending around at least a part of the periphery 7a of the guide drum 7, a supply side path portion 9d extending from the inlet 9a to the peripheral path portion 9c, and a take-up side path portion 9e extending from the peripheral path portion 9c to the outlet 9b. The supply side path portion 9d is shown to include a first substantially horizontal path section 9f which extends from the inlet 9a to a first turning path section 9g, and a second substantially horizontal path section 9h extending from the first turning path section 9g to the peripheral path portion 9c adjacent the upper portion of the guide drum 7. The peripheral path portion 9c forms a second turning path section, and the take-up side path portion 9 includes a third substantially horizontal path section 9i which extends from the second turning path section to the outlet 9b of the path 9. It will be appreciated from the foregoing that path 9 has an approximately Z-shaped gently curving configuration which efficiently occupies the space in front of the main body 1 under the supply and take-up reels 5 and 6.

Figure 5:
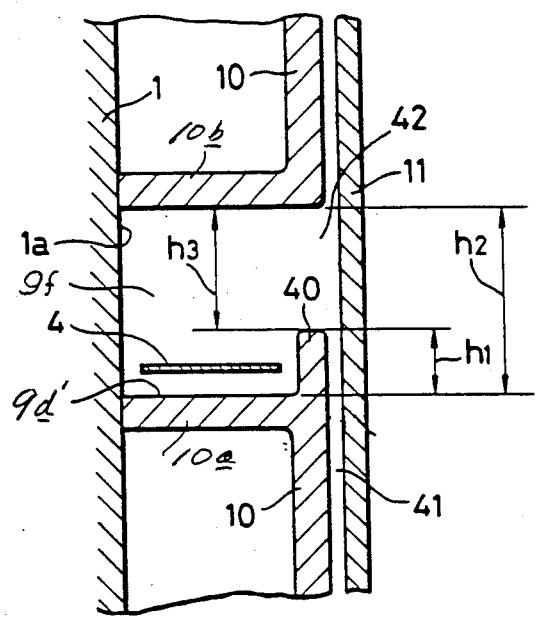
FIG. 5 is a vertical sectional view, on an enlarged scale, of a portion of the tape path shown on FIG. 1.

As shown particularly on FIG. 5, the tape path 9 is definded, at the back thereof, by the front surface 1a of the main body 1 of the VTR, and by a front panel 10 suitably secured on the body 1 and having wall sections, as at 10a and 10b directed rearwardly to front surface 1a for defining the tape path 9a therebetween. It will appreciated that the tape path 9, as thus defined, has an opening along its front side, as at 42 on FIG. 5, and through which access may be had to the tape 4 in the path 9. Further, as shown on FIGS. 2 and 5 a front cover 11 preferably made of a transparent synthetic resin or the like is pivotally mounted on the main body 1 by hinges 12 so as to movable to and from a closed position, indicated in dot-dash lines on FIG. 2, and at which the cover 11 substantially envelopes the front panel 10 and closes the opening 42 along the front side of the tape path 9. A suitable locking device (not shown) is desirably provided for securing the cover 11 in its closed position. In order that the magnetic tape 4 will be wrapped helically around the peripheral surface 7a of the guide drum 7, the take-up reel 6 is offset forwardly relative to the supply reel 5, as is apparent on FIG. 2, and the tape path 9 is suitably tilted so that the inlet 9a thereof is aligned with the plane of rotation of the supply reel 5 and the outlet 9b of the tape path is aligned with the plane of rotation of the take-up reel 6.

Referring again to FIG. 1, it will be seen that a guide post 14, a tension detector 15, a guide roller 16, a fullwidth erasing heat 17 and an entrance guide 18 are arranged in sequence at spaced apart locations along the supply side path portion 9d of the tape path. An exit guide 19, a tape guide 20, an impedance roller 21, an audio erasing head 22, an audio recording and/or reproducing head 23, an audio monitoring head 24, a capstan 25 and an associated pinch roller 26, and a guide roller 27 are arranged in succession at spaced apart locations along the take-up side path portion 9e of the tape path.

A plurality of air outlets 29a, 29b, 29d and 29e open into the tape path 9 at spaced apart locations along the latter and are connected to a blower 30 through air conducting conduits 32a, 32b, 32d and 32e, respectively. An additional air outlet 29c also opens into the tape path 9, as hereinafter described in detail, and is connected to another blower 31 through a conduit 32c. Moreover, the blower 31 has an inlet 33 connected to a number of suction ports (not shown) opening at the peripheral surface of a hub 6a of the take-up reel 6 so that, when the blower 31 is operating, suction forces indicated by the arrows f on FIG. 1, are available for causing a leading end portion of the tape 4 to adhere to the hub-surface 6a for winding on the take-up reel.

A photo sensor 35 is provided near the outlet 9b of the tape path 9 and may include a light-emitting element 36 at one side of the path 9 and a light-receiving element 37 at the opposite side of the tape path. The element 37 is positioned to receive light 38 from the emitting element 36 except when tape 4 is present between elements 36 and 37 for intercepting or blocking the light 38.

The operation of the loading device in loading the magnetic tape from the supply reel 5 through the tape path 9 about the guide drum 7 and from the outlet 9b of the tape path to the take-up reel 6 will be described below:

As shown on FIG. 1, when the blowers 30 and 31 are operated, air under pressure is directed from the air outlets 29a to 29e into the tape path 9 in the directions indicated by the arrows a to e, respectively. Further, as already noted, and as indicated by the arrows f, air flows are directed inwardly through the suction ports in the peripheral surface of the hub 6a of the take-up reel 6.

Initially, a leading end portion 4a of the magnetic tape 4 wound on the supply reel 5 is brought to the inlet 9a of the tape path 9, and the supply reel 5 is manually or automatically turned in the direction of the arrow g so as to pay out the magnetic tape 4 therefrom. Due to the air under pressure being supplied to the tape path 9 in the directions of the arrows a to e, the magnetic tape 4 paid out from the supply reel 5 is conveyed in the direction of the arrow h from the inlet 9a, through the supply side path portion 9d, the peripheral path portion 9c and the take-up side path portion 9e, in sequence, to the outlet 9b of the tape path 9. When the leading end portion 4a of the magnetic tape 4 reaches the outlet 9b, such leading end portion 4a interrupts the light 38 emitted from the element 36 toward the light-receiving element 37 so that the photo sensor 35 thereby senses or detects the arrival of the leading end portion 4a of the tape at the outlet 9b.

Figure 4:
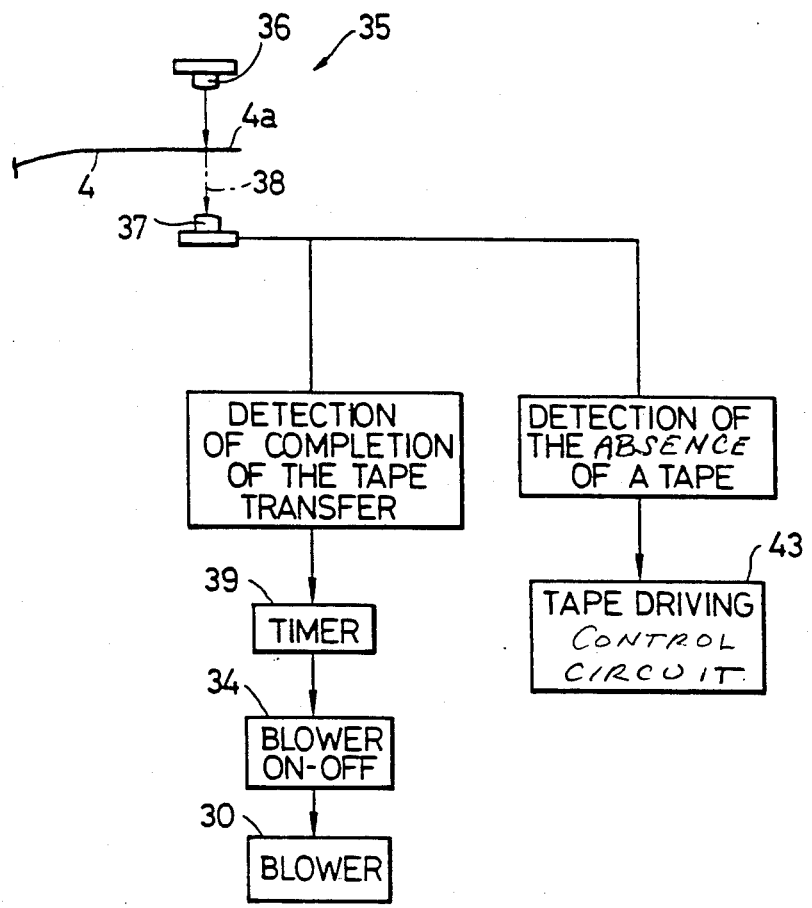
FIG. 4 is a block diagram illustrating a control system of the loading device shown on FIG. 1, and to which reference will be made in explaining the operations thereof.

When the photo sensor 35 detects the arrival of the leading end portion 4a of the tape at the outlet 9b, that is, detects the completion of the tape transfer, the operation of a timer 39 is thereby initiated, as shown on FIG. 4. When the timer 39 has counted the passage of a predetermined time from the initiation of its operation, a blower ON/Off circuit 34 is actuated to halt the operation of the blower 30. It will be appreciated that, during the predetermined time set by the timer 39, which may be further extended by, or may include the short time period in which the blower 30, due to inertia, continues to pump air after the energizing of its motor has been interrupted by the circuit 34, the supplying of air under pressure from the outlets 29a to 29e into the tape path 9 causes continued transport of the tape so that its leading end portion 4 finally extends a predetermined distance from the outlet 9b, as indicated at h'. When the operation of the blower 30 is halted, the supplying of the air under pressure to the tape path 9 through the air outlets 29a, 29b, 29d and 29e is stopped so that the magnetic tape 4 is not further conveyed along the path 9. The manual or automatic rotation of the supply reel 5 during the transport of the tape through the path 9 by air under pressure admitted at air outlets 29a to 29e is halted at the time when the operation of the blower 30 is halted.

The leading end portion 4a of the magnetic tape projecting out of the outlet 9b of the tape path 9 is then manually picked up and moved in the direction of the arrow i toward the hub 6a of the take-up reel 6. By reason of the air suction forces indicated by the arrows f and which would from the continued operation of the blower 31, the leading end portion 4a of the magnetic tape is made to adhere to the surface of the hub 6a and the take-up reel 6 is turned in the direction of the arrow l for initiating the winding of the tape 4 on the hub 6a and taking up the slack in the magnetic tape as indicated by the dot-line on FIG. 1. When the leading end 4a of the tape has thus been firmly attached to the periphery of the hub 6a, the operation of the blower 31 is also halted.

The leading end portion 4a of the magnetic tape projecting out of the outlet 9b of the tape path 9 is then manually picked up and moved in the direction of the arrow i toward the hub 6a of the take-up reel 6. By reason of the air suction forces indicated by the arrows f and which result from the continued operation of the blower 31, the leading end portion 4a of the magnetic tape is made to adhere to the surface of the hub 6a and the take-up reel 6 is turned in the direction of the arrow 1 for initiating the winding of the tape 4 on the hub 6a and taking up of the slack in the magnetic tape as indicated by the dot-line on FIG. 1. When the leading end 4a of the tape has thus been firmly attached to the periphery of the hub 6a, the operation of the blower 31 is also halted.

Although the leading end portion 4a of the magnetic tape 4 is adhered by suction to the hub 6a of the take-up reel 6 at the initiation of the winding of the tape on the take-up reel in the illustrated embodiment of the invention, that arrangement is not necessary to the invention. For example, the leading end portion 4a of the magnetic tape may be inserted into one of a number of slits (not shown) formed in the hub 6a, or the leading end portion of the tape may be otherwise secured to the hub 6a.

It will be appreciated that, during the loading operation in the VTR incorporating a loading device according to this invention, the tension detector 15, the full-width erasing head 17, the entrance guide 18, the tape guide 20 and the pinch roller 26 are suitably disposed in respective inactive positions indicated by dotted lines on FIG. 1, in which inactive positions the mentioned elements of the VTR are removed from the tape path 9 so as to avoid interference with the transport of the magnetic tape 4 along such path. Upon the completion of the above described loading operation, that is, after the leading end portion 4a of the magnetic tape 4 has been adhered to the hub 6a of the take-up reel and initial winding of the tape on the hub of reel 6 has been effected, a standby button (not shown) of the VTR is depressed or actuated and, in response thereto, a rotary portion of the guide drum 7 and the rotary heads mounted thereon are suitably rotated in the direction of the arrow j, and the tension detector 15, erasing head 17, entrance guide 18, exit guide 19 and tape guide 20 are moved from their inactive positions to active positions indicate by dot-dash lines on FIG. 1. As a result of the foregoing, the magnetic tape 4 between reels 5 and 6 follows the path indicated in dot-dash lines and is wrapped helically around the periphery 7a of guide drum 7.

When a play button (not shown) of the VTR is depressed, capstan 25 is suitably rotated in a direction of the arrow k on FIG. 1, and the pinch roller 26 is moved to the position shown in dot-dash lines so as to press the tape 4 against the rotated capstan for driving the tape while the supply reel 5 and the take-up reel 6 are rotated in the directions of the arrows g and l, respectively. Therefore, the magnetic tape 4 is driven at a constant speed through the tape path 9 in the direction of the arrow h during a recording or reproducing operation.

If the magnetic tape 4 is inadvertently severed during a recording or reproducing operation, or when the VTR is in its fast-forward or rewinding mode, or if the magnetic tape 4 is completely wound on the take-up reel 6 or the supply reel 5, so that the light-receiving element 37 of the photo sensor 35 again receives light 38 from the element 36, the resulting indication that the magnetic tape 4 is not present in the tape path 9 causes a tape driving control circuit 43 (FIG. 4) to halt the operation of the tape driving system, that is, to halt the rotation of the capstan 25 and of the reels 5 and 6, and also causes rotation of the rotary portion of the guide drum 7 to be halted.

It will be seen that, in the loading device according to this invention, the peripheral path portion 9c is defined, in part, at the underside of the guide drum 7, by a lower wall section 9c' which faces upwardly in the normal operating position of the VTR. Further, the supply side path portion 9d of the tape path 9 is defined, at least in part, by upwardly facing lower wall sections 9d' along the first substantially horizontal path section 9f extending from the inlet 9a to the first turning path section 9g, and along the second substantially horizontal path section 9h extending from the turning path section 9g to the peripheral path portion 9c. Similarly, the third substantially horizontal path section 9i of the take-up side path portion 9e is defined, in part, by a lower wall section 9e' facing upwardly in the normal operating position. Furthermore, in accordance with this invention, the air outlets 29a, 29b and 29c all open at the upwardly facing lower wall sections 9d' of the supply side path portion for directing air under pressure into the path 9 along the respective lower wall sections. Similarly, the air outlets 29d and 29e open at the lower wall sections 9c' and 9e', respectively, of the peripheral and take-up path portions, respectivly, for directing under pressure into the path 9 along the respective lower wall sections. By reason of the foregoing, air under pressure supplied from the air outlets 29a to 29e in the directions of the arrows a to e, respectively, form tape supporting air flows or streams along the lower wall sections 9d', 9c' and 9e' and on which the magnetic tape 4 is conveyed substantially out of contact with the surfaces of such lower wall sections. Therefore, the magnetic tape 4 may be reliably conveyed from the inlet 9a to the outlet 9b of the path 9 by the blowers 30 and 31 which need not be very powerful.

It will be appreciated that the foregoing advantageous effect is attainable by providing the path 9 which extends from the inlet 9a adjacent the supply reel 5 around the guide drum 7 to the outlet 9b under the take-up reel 6 with a generally zig-zag configuration having substantially horizontal path sections 9f, 9h and 9i at which the tape 4 can be conveyed or floated on the streams or flows of air under pressure directed along the lower wall sections 9d', 9c' and 9e'.

Figure 3:
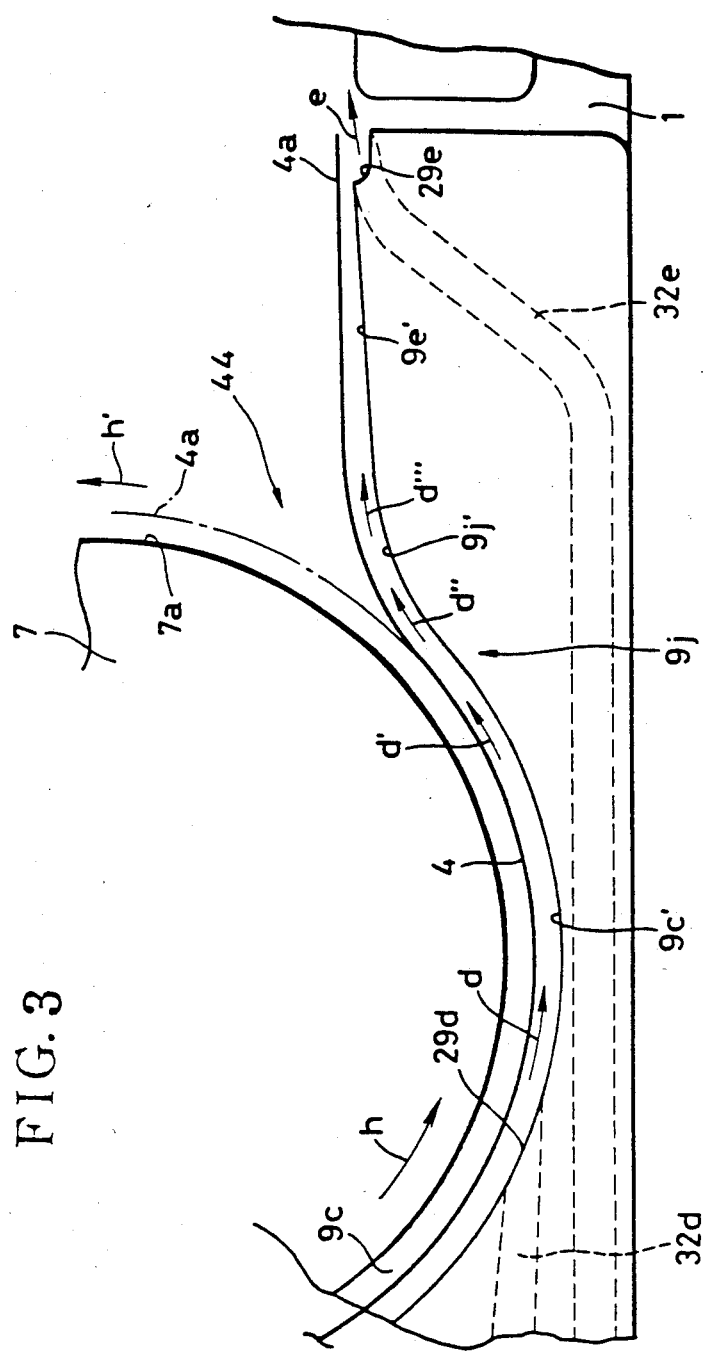
FIG. 3 is an enlarged, fragmentary front view of a portion of the tape path in the loading device of FIG. 1.

As shown particularly on FIG. 3, the tape path 9 is preferrably provided with a connecting path portion 9j between the peripheral path portion 9c and the take-up side path portion 9e. Such connecting portion 9j has a lower wall section 9j' having a gradual curvature which is in the reverse direction from the curvature of the lower wall section 9c' of the peripheral path portion 9c which follows the periphery 7a of the guide drum 7. As a result of the foregoing, ad the Coanda effect by which a jet stream flowing along a wall surface tends to flow close to latter even when such surface is convexly curved, air under pressure supplied from the outlet 29d into the peripheral path portion 9c in the direction of the arrow d flows along the reversely curved lower wall section 9j' of the connecting path portion 9j as indicated by the arrows d', d'' and d'''. Therefore, the leading end 4a of the magnetic tape 4 is reliably conveyed along the lower wall section 9j' and onto the lower wall section 9e' of the take-up path portion 9e, as indicated in full lines on FIG. 3. In other words, the described configuration of the tape path at the connecting path portion 9j ensures that the leading end 4a of the magnetic tape 4 will be smoothly and reliably conveyed from the peripheral path portion 9c to the take-up side path portion 9e, rather than being wound on the periphery 7a of the rotary drum 7 in the direction of the arrow h', as indicated by the dot-dash lines on FIG. 3.

It is further to be seen that the air under pressure issuing from the outlet 29c in the direction along the lower wall section 9d' of the second substantially horizontal path 9h forms an air flow under the tape to support the leading end portion of the latter and to direct the same into the entrance of the peripheral path portion 9c at the top portion of guide drum 7. By reason of such air flow directing the leading end portion of the tape into the entrance of the peripheral path portion 9c, and by reason of the earlier described air flow conforming to the connecting path portion 9j adjacent the exit from the peripheral path portion 9c, the front panel 10 may be shaped to leave a relatively large space or gap 44 near the entrance and exit of the peripheral path portion 9c without the possibility that such large space 44 will adversely affect the reliability with which the leading end portion of the tape 4 is lead into and out of the entrance and exit of the peripheral path portion 9c during a loading operation. Such relatively large space 44 is advantageous in that it facilitates the cleaning of the guide drum 7 and of the rotary heads associated therewith.

By reason of the zig-zag configuration of the tape path 9 comprised of successive horizontal path sections 9f, 9h, 9i arranged one above the other in the space below supply reel 5 and take-up reel 6 to one side of the guide drum 7, the height $H_1$ of the zig-zag or folded tape path 9 can be small so as to reduce the overall height $H_2$ of the main body 1 of the VTR.

As shown on FIG. 5 in respect to the first substantially horizontal path section 9f of the tape path 9, the upwardly facing lower wall secion 9d' or 9e' of each of the substantially horizontal path sections 9f, 9h or 9i has an upstanding guide fence 40 extending therealong at the side of the path 9 provided with the opening 42. Each guide fence 40 is desirably formed integrally with the front panel 10 which is conveniently molded or otherwise formed of a synthetic resin. It will be apparent that, when the magnetic tape 4 is conveyed on a flow of air under pressure on the upwardly facing lower wall section 9d' or 9e', the longitudinal edge of the tape at the side thereof closest to the front cover 11 is guided by the respective fence 40 so that the tape 4 can not inadvertently move into a gap 41 that may open between the front cover 11 and the front panel 10. Therefore, the guide fences 40 ensure that the magnetic tape 4 will be smoothly and reliably conveyed on the air flows along the tape path 9 and will not snag or be caught in the gap 41.

As further shown on FIG. 5, the height $h_1$ of each of the guide fences 40 is selected in relation to the overall height $h_2$ of the tape path 9 so that the height $h_3$ of the opening 42 at the front side of the tape path will be large enough to readily permit access to the tape 4 in the path 9 through the opening 42 when the cover 11 is opened or removed. Thus, manual guiding of the tape along the path 4 is facilitated.

Figure 6:
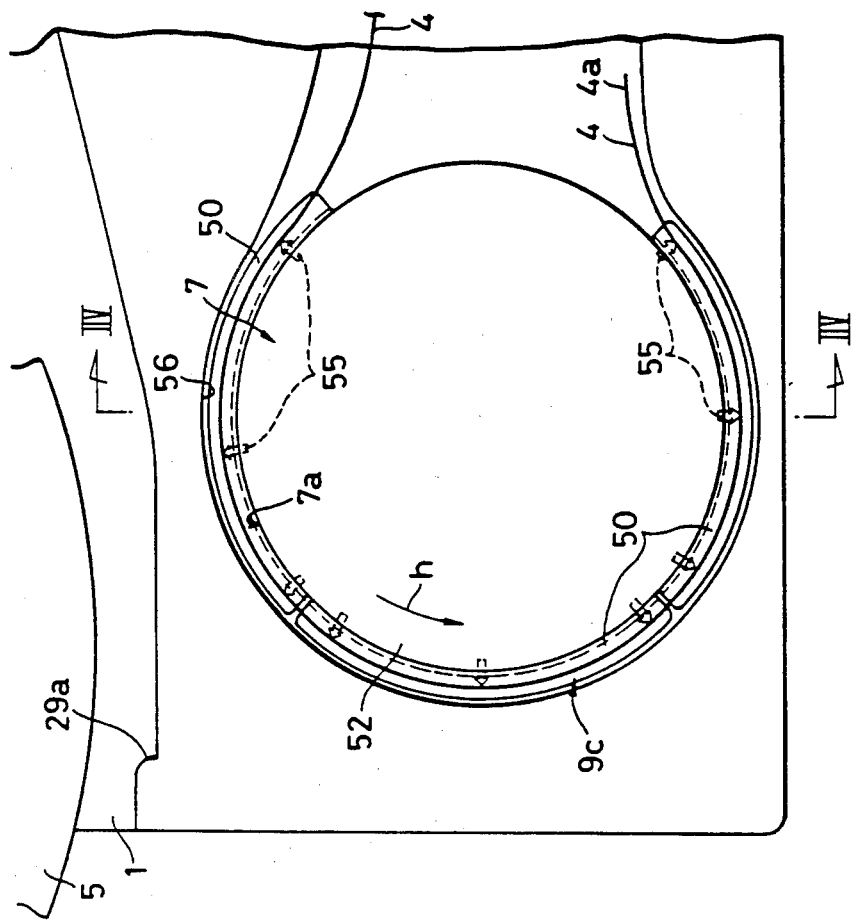
FIG. 6 is an enlarged, fragmentary front elevational view of a portion of the tape path of FIG. 1. which extends around the periphery of a guide drum.
Figure 7:
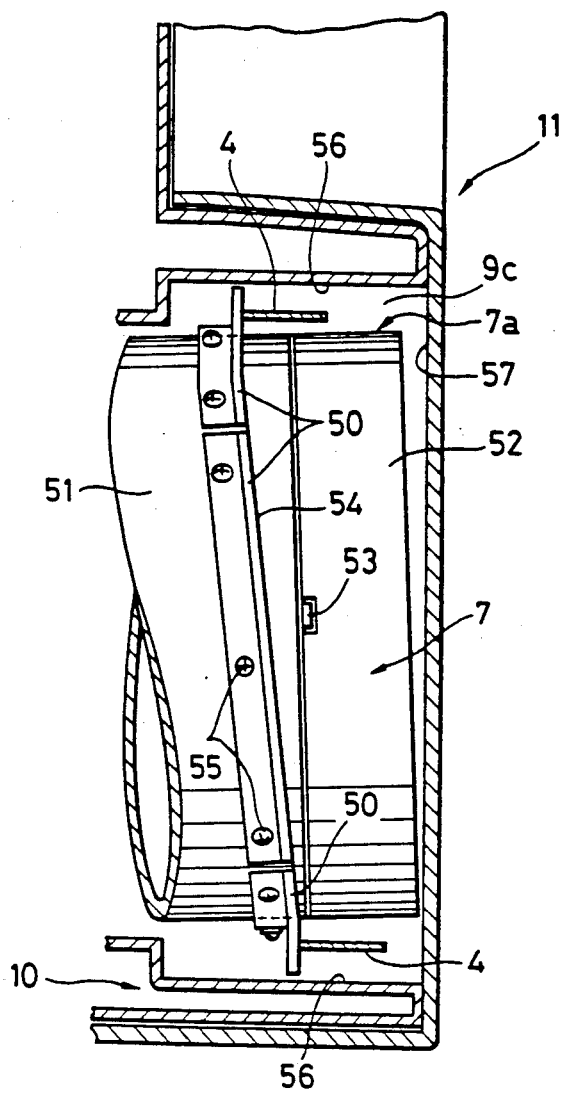
FIG. 7 is a further enlarged vertical sectional view taken along the line VII—VII on FIG. 6.
Figure 8:
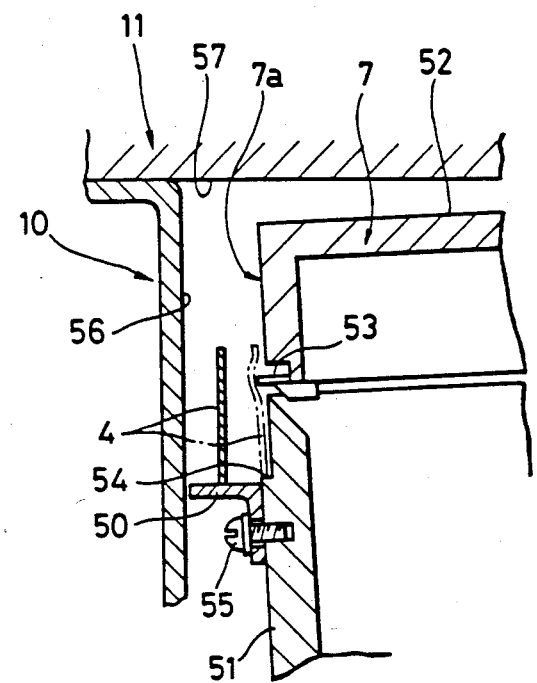
FIG. 8 is a fragmentary, still further enlarged sectional view of a portion of the structure shown on FIG. 7.

Furthermore, and as shown on FIGS. 6–8, in a loading device according to an embodiment of this invention, a drum fence 50 extends around at least a portion of the periphery 7a of the guide drum 7 for reliably guiding the tape in the peripheral path portion 9c during a loading operation. More particularly, the guide drum 7 is shown to include a stationery drum portion 51 and a rotary drum portion 52 with which a plurality of heads 53 are rotatable. A tape lead 54, in the form of a shallow recess defining a tape-guiding shoulder, is formed helically in the peripheral surface of the stationery drum portion 51, and the drum fence 50 is mounted on the peripheral surface of the stationery drum portion 51 along the shoulder defined by the tape lead 54 and projects a substantial distance radially into the peripheral path portion 9c, as particularly shown on FIGS. 7 and 8. The drum fence 50 may be comprised of a number of circumferentially successive fence elements secured to the drum portion 51 by screws 55 as shown. Of course, the drum fence 50 may be formed as a unitary member, in which case the number of screws 55 can be reduced.

In the illustrated embodiment, the peripheral path portion 9c is shown to be defined by the peripheral surface 7a of the guide drum 7, a part-cylindrical wall 56 directed rearwardly from the front panel 10 and formed integrally with the latter so as to be spaced radially outward from the peripheral surface 7a, the drum fence 50 extending from the peripheral surface 7a near to the inner surface of the wall 56 to define the backside of the peripheral path portion 9c, and a wall 57 of the front cover which closes the peripheral path portion 9c at the front side of the latter. It will be appreciated that, even if the mainbody 1 of the VTR is inclined as much as 20° from its normal vertical position during a loading operation, the drum fence 50 ensures that the magnetic tape 4 will be reliably guided along the tape lead 54 during the conveying of the tape through the peripheral path portion 9c by the previously described air flows. Therefore, when a recording or reproducing operation is initiated after the loading of the magnetic tape, the latter is reliably transferred from a relatively loose position guided by the drum fence 50, as indicated by solid lines on FIG. 8, to a tensioned position against the peripheral surface 7a and guided by the tape lead 54, as indicated in dot-dash lines on FIG. 8. Thus, during the recording or reproducing operation, the magnetic tape 4 is accurately guided by the tape lead 54 for ensuring that the heads 53 will accurately perform the recording or reproducing operation.

Figure 9:
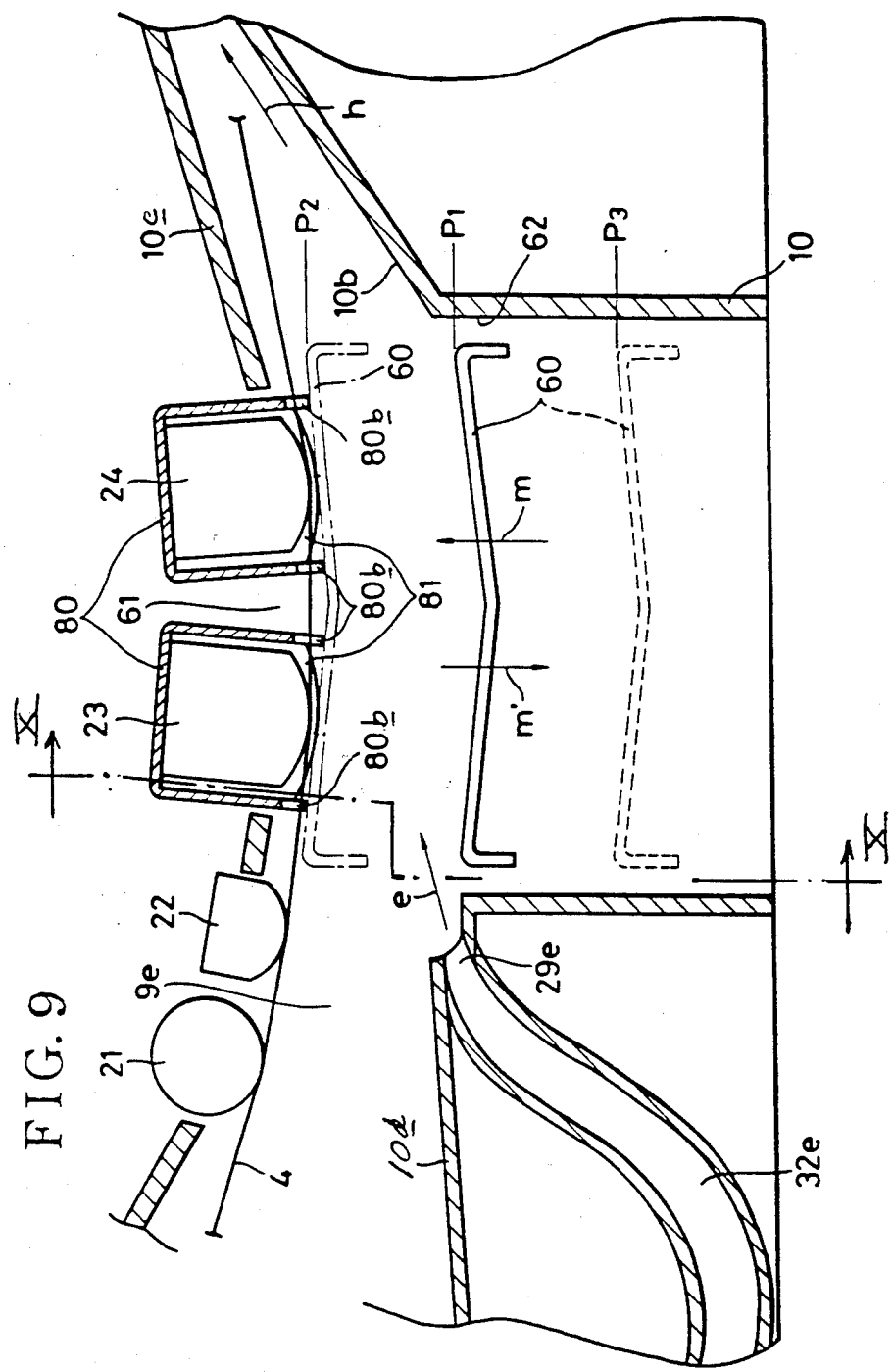
FIG. 9 is an enlarged fragmentary sectional view showing a shield plate for magnetically shielding fixed heads included in the video tape recorder of FIG. 1 as viewed from the front of the latter.

Referring now to FIGS. 9–11, it will be seen that, in the illustrated VTR having a loading device according to an embodiment of this invention, the audio recording and/or reproducing head 23 and the audio monitoring head 24 face downwardly close to each other within a cut-out 61 provided in a wall portion 10c of the front panel 10 which defines the upper wall section of the take-up side path portion 9e. The heads 23 and 24 are located within respective magnetic shielding cases 80 which open downwardly, as at 81, into path portion 9e so that the active faces of the magnetic heads 23 and 24 are exposed through the openings 81 for engagement by the magnetic tape 4 in the take-up side path portion 9e during a recording or reproducing operation.

The edges of opposite sides of each of the shielding casings 80 have shallow cut-outs 80a through which the tape can run when engaging the active faces of the heads 23 and 24. A magnetic shield plate 60 is provided for magnetically shielding both of the heads 23 and 24 as hereinafter described in detail. The magnetic shield plate 60 is substantially horizontally arranged and disposed in the position indicated in full lines at $P_1$ on FIG. 9 during a loading operation. When in such position $P_1$, the magnetic shield plate 60 is situated in a cut-out 62 formed opposite the heads 23 and 24 in a portion 10d of the front panel 10 which forms the lower wall section of the path portion 9e. Therefore, the magnetic shield plate 60, when in its position $P_1$, functions as a part or extension of the lower wall section of the take-up side path portion 9e.

A movable mounting assembly 63 (FIGS. 10A, B and C and FIG. 11) carries the magnetic shield plate 60 for movement from the position $P_1$ thereof in the directions of the arrows m and m', that is, in the directions toward and away from the heads 23 and 24. More specifically, the magnetic shield plate 60 is movable from the previously described first position $P_1$ in the direction of the arrow m to a second position $P_2$ which is close to the magnetic heads 23 and 24 and indicated by dot-dash lines in FIG. 9 and also shown on FIG. 10B. Alternatively, the shield plate 60 is movable from the first position $P_1$ in the direction of the arrow m' away from the heads 23 and 24 to the position $P_3$ shown in dotted lines on FIG. 9 and also shown in FIG. 10C.

The movable mounting assembly 63 includes a so-called parallel motion linkage by which the plate 60 remains parallel to the first position $P_1$ thereof while moving from such position to either the second position $P_2$ or the third position $P_3$. As shown particularly on FIG. 11, the assembly 63 includes a mounting bracket 64 suitably secured to the main body 1 of the VTR and supporting a horizontally directed shaft 65. Angled first links 66a and 66b are pivotally mounted, at their back ends, on the opposite end portions of the shaft 65 and extend forwardly from the latter. At their forward ends, the first links 66a and 66b are connected to the opposite end portions of a pivot shaft 67 which extends parallel to the shaft 65. A support plate 68 has ears 68a and 68b which are directed forwardly from its opposite ends and pivotally mounted on the shaft 67. A pivot pin 69 is situated below the shaft 65 and is carried by a flange 64a directed forwardly from bracket 64 at the side of the latter which is adjacent the first link 66b. A second link 71 is pivotally mounted, at its back end, on the pivot pin 69, and the forward end of the second link 71 is pivotally connected to a pivot pin 70 extending from the adjacent ear 68b. The links 66b and 71 constitute the previously mentioned parallel motion linkage, and the magnetic shield plate 60 is elastically supported on the plate 68 through a leaf spring (not shown) or the like.

A drive lever 72 extends rearwardly from an inverted U-shaped mounting portion 72' which is pivoted on the end portion of the shaft 65 remote from flange 64a. The drive lever 72 is yieldably coupled to the first link 66a through a torsion spring 73 which is coiled about shaft 65 within the mounting portion 72', and which has one end portion 73a of the torsion spring bearing against a lug 66a' on the first link 66a, while the other end portion 73b of the torsion spring bears against a lug 72a formed on the mounting portion 72' of the drive lever 72. The coiled torsion spring 73 urges the first link 66a and the drive lever 72 to pivot relative to each other in the directions of the arrows m' and n, respectively, on FIG. 11 to a position in which the lug 66a' on link 66a bears against a stopper 72b on the mounting portion 73' of the drive lever 72.

Figure 10A:
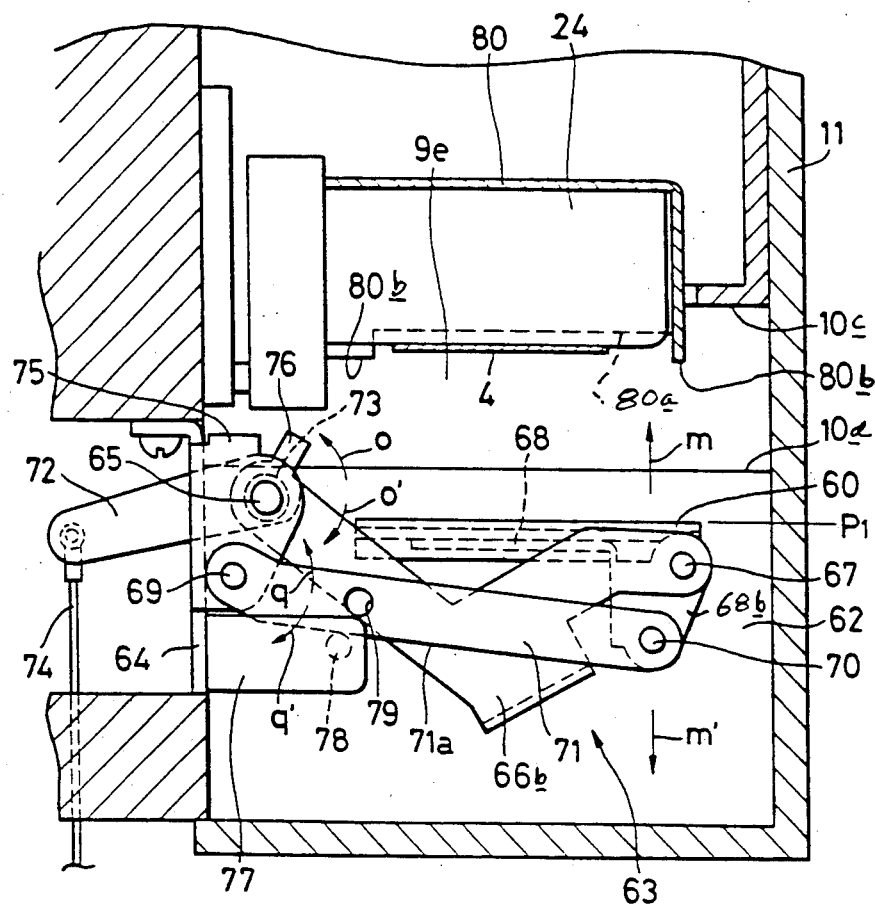
FIGS. 10A, 10B and 10C are sectional views taken along the line X—X on FIG. 9, and showing the magnetic shield palte in several respective positions thereof.

As shown on FIG. 10A, the back end of the drive lever 72 is pivotally connected with a cable or wire 74 which is suitably movable or interlocked with the movable entrance and exit guides 18 and 19 described previously with reference to FIG. 1. Returning to FIG. 11, it will be seen that a stopper 75 is provided at the upper end of the flange 64a of mounting bracket 64 is engageable by a lug 76 projecting from the back end portion of the first link 66b for limiting the upward swinging of the first links 66a and 66b, that is, the swinging in the direction of the arrow o on FIG. 10A. Finally, a leaf spring 77 projects forwardly from mounting bracket 64 under flange 64a and, at its forward end portion, carries a conical stopper pin 78. The pin 78 is engageable by the lower edge 71a of the second link 71 as the latter pivots about the pin 69 in the direction of the arrow q' on FIG. 10A. Further, the conical stopper pin 78 is engageable in a suitably located hole 79 in the second link 71 when the latter is pivoted further in the direction of the arrow q' to the position shown on FIG. 10C.

The operation of the assembly 63 in selectively moving the magnetic shield plate 60 will now be described:

During a loading operation, that is, when the magnetic tape 5 is transported through the path 9, as previously described, the magnetic shield plate 60 is located in the first position $P_1$ indicated by solid lines on FIG. 9 and also shown in FIG. 10A. In order to thus position the magnetic shield plate 60, the lower edge 71a of the second link 71 abuts against the conical stopper pin 78 on the leaf spring 77 and is held thereat by the weight of the elements making up the assembly 63. During the loading operation, the magnetic shield plate 60 forms an extension of the lower wall section of the take-up side path portion 9e so as to avoid any interference with the conveyance of the magnetic tape through the path 9. Furthermore, in the position $P_1$, the magnetic shield plate 60 effectively guides the air under pressure issuing from the outlet 29e in the direction of the arrow e with the result that the air under pressure flows smoothly through the path portion 9e for smoothly conveying the magnetic tap 4 therealong.

Figure 10B:
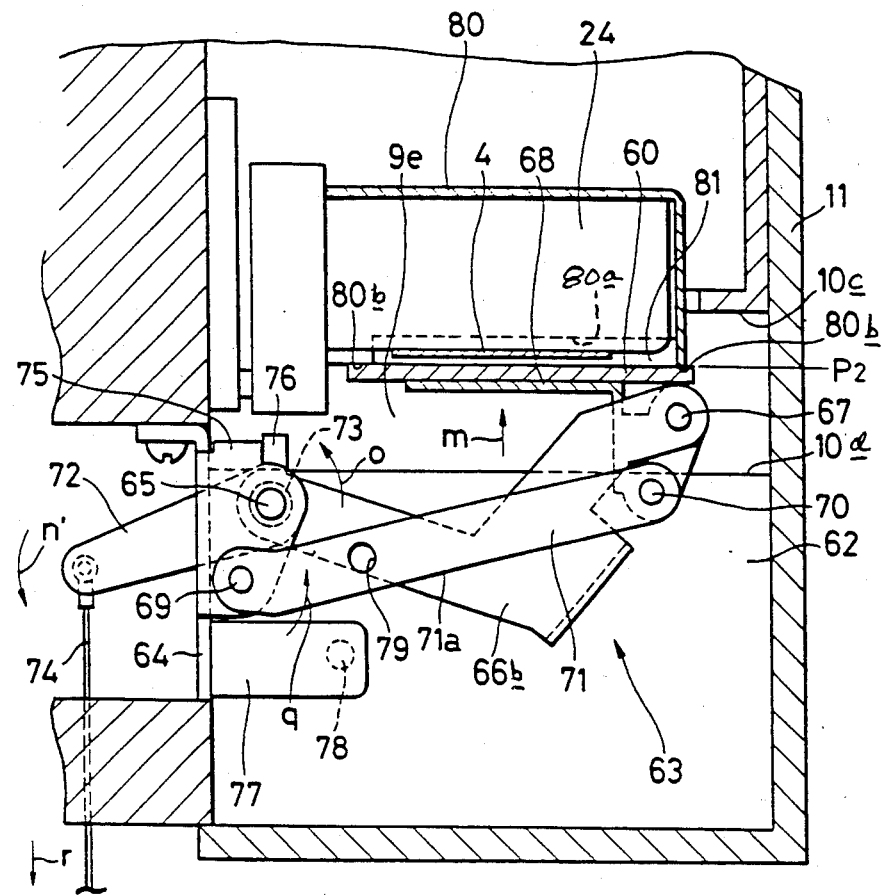

After the loading operation has been completed and the standby button is depressed for moving the entrance and exit guides 18 and 19 to their active positions indicated by dot-dash lines on FIG. 1, as previously described, the wire or cable 74 is pulled in the direction of the arrow r on FIG. 10B in association with the movement of the guides 18 and 19 to their active positions. Such pull on the wire or cable 74 angularly displaced drive lever 72 in the direction of the arrow m' on FIG. 10B, and the links 66a and 66b are urged through the torsion spring 73 to similarly pivot about the shaft 65 in the direction of the arrow o. As a result of the pivoting of the link 66b in the direction of the arrow o, the second link 71 is made to pivot about the pin 69 in the direction of the arrow q. By reason of the spacing of the pivot pin 69 from the pivot shaft 65 and the similar spacing of the pivot pin 70 from the pivot shaft 67, the plate 68 causes upward movement of the magnetic plate 60 parallel to itself to the second position $P_2$ shown on FIG. 10B, and in which the lug 76 on link 66b engages against the stopper 75 for preventing further turning of the links 66a and 66b in the direction of the arrow o. In its position $P_2$, the magnetic shield plate 60 is elastically pressed from below against the bottom edges 80b of the downwardly opening shield casings 80 due to the leaf spring (not shown) or the like interposed between the magnetic shield plate 60 and the interlying plate 68. In such position of the magnetic shield plate 60, the magnetic heads 23 and 24 are effectively shielded by the casings 80 and shield plate 60 while the magnetic tape 4 can run through the shallow recesses or cutouts 80a for engaging the active faces of the heads 23 and 24.

Accordingly, when the play button of the VTR is depressed for establishing a recording or reproducing operation of the VTR, the magnetic tape 4 runs in the tape path 9 in the direction of the arrow h at a constant speed for performing the recording or reproducing operation, and the magnetic heads 23 and 24 are reliably magnetically shielded for ensuring that noiseless recording or reproducing will be achieved.

When the stop button of the VTR is depressed to halt the recording or reproducing operation, movement of the magnetic tape in the direction of the arrow h on FIG. 1 is halted, and the entrance and exit guides 18 and 19 are conventionally returned from the active positions thereof to the inactive positions indicated by the dotted lines on FIG. 1. In association with such movements of the guides 18 and 19 to their inactive positions, the pull on wire or cable 74 in the direction of the arrow r on FIG. 10B is released, that is, the links 66a, 66b and 71 of the shield plate mounting asembly 63 are free to swing about shaft 65 and pin 69 in the directions of the arrows o' and 1', respectively, under the weight of such links and the plate 68 and 60 carried thereby, so that the magnetic shield plate 60 is moved downwardly in the direction of the arrow m' to its first position $P_1$ determined by the engagement of the lower edge 71a of the link 71 with the conical stopper pin 78.

Figure 10C:
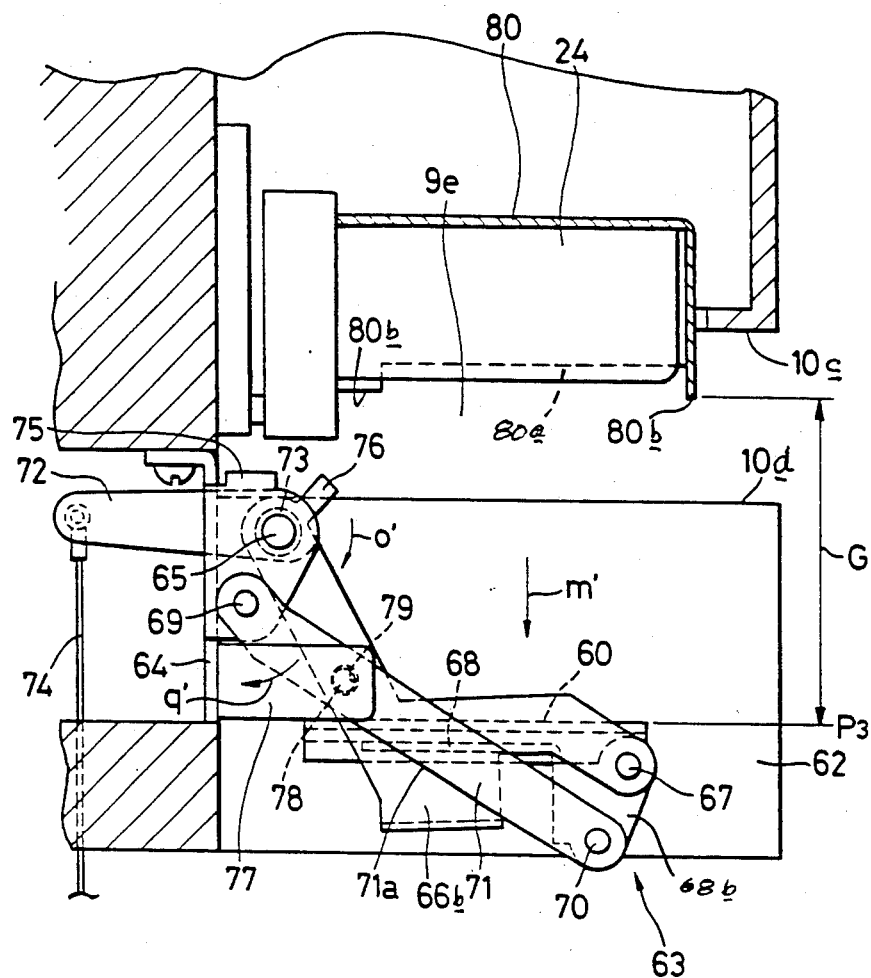

When it is desirable to clean the active surfaces and gaps of the magnetic heads 23 and 24 or to otherwise perform maintenance thereon, such as, demagnetization of the heads 23 and 24 or adjustments of the heights, azimuths and the like of the heads 23 and 24, or to mark the magnetic tape 4 during audio tape editing, the user of the VTR bears downwardly with a finger on the shaft 67 or one the link 66b so as to displace the same in the direction of the arrow m' on FIG. 10C. Since the driver lever 72 is not being moved, the links 66a and 66b and the link 71 are pivoted about the shaft 65 and the pivot pin 69 in the direction of the arrows o' and q' against the force of the torsion spring 73, and the magnetic shield plate 60 is moved to the position $P_3$ shown on FIG. 10C. In the course of such movement of the link 71, the action of the lower edge 71a of the link against the conical stopper pin 78 causes outward flexing of the leaf spring 77 until the conical stopper pin 78 slides on the surface of the link 71 and registers with and engages the hole 79 for retaining the magnetic shield plate 60 in its position $P_3$.

In such position $P_3$, the magnetic shield plate 60 is separated from the magnetic heads 23 and 24 by a large distance so as to provide a large gap G through which ready access to the heads 23 and 24 may be had for cleaning, demagnetization or adjustment of the heads 23 and 24 or for providing marks on the magnetic tape 4.

Although an illustrative embodiment of this invention has been described above with reference to the accompanying drawings, it is to be understood that the invention is not limited to that precise embodiment, and that various changes and modifications may be effected therein by one skilled in the art without departing from the scope or spirit of invention as defined in the appended claims.

What is claimed is:

1. A loading device for loading a tape-like element in an apparatus having supply and take-up reels which are disposed side-by-side with their axes substantially horizontal in a normal operating position of the apparatus, and a guide drum under said supply reel in said normal operating position, said loading device comprising:
    means defining a path for the tape-like element and having an inlet adjacent said supply reel for receiving the tape-like element paid out from the latter and an outlet arranged near to said take-up reel, said path including a peripheral path portion extending around at least part of the periphery of said guide drum, a supply side path portion extending from said inlet to said peripheral path portion and a take-up side path portion extending from said peripheral path portion to said outlet, said supply side, peripheral and take-up path portions having respective lower wall sections facing upwardly in said normal operating position;
    a plurality of air outlets opening at said lower wall sections of said supply side, peripheral and take-up path portions, respectively, for directing air under pressure into said path along the respective lower wall sections;
    an additional air outlet opening at said lower wall section of the supply side path portion near to said peripheral path portion for directing air under pressure into said peripheral path portion; and
    blower means operative for supplying air under pressure to said plurality of air outlets and said additional air outlet so that the tape-like element paid out from said supply reel is conveyed by air under pressure issuing from said plurality of air outlets and is wound about said guide drum by air under pressure issuing from said additional air outlet for transporting of the tape-like element from said inlet to said outlet of the path.

2. A loading device according to claim 1; in which said supply side path portion includes a first substantially horizontal path section extending from said inlet, a first turning path section extending from said first substantially horizontal path section and a second substantially horizontal path section extending from said first turning path section to said peripheral path portion which includes a second turning path section; and in which said take-up side path portion includes a third substantially horizontal path section extending from said second turning path section to said outlet of the path.

3. A loading device according to claim 1; in which said means defining the path provides an opening along one side of said path through which access may be had to the tape-like element in said path; and further comprising a movably mounted cover adapted to close said opening along said one side of the path.

4. A loading device according to claim 3; in which said lower wall sections each have an upstanding guide fence extending therealong at said one side of the path provided with said opening.

5. A loading device according to claim 4; in which said periphery of the guide drum has a tape lead formed therein for guiding the tape-like element around said guide drum during operation of said apparatus; and further comprising a drum fence protruding from said periphery of the guide drum for guiding the tape-like element during said transporting thereof by the air under pressure and thereafter ensuring the engagement of the tape-like element with said tape lead.

6. A loading device according to claim 5; in which said tape lead is constituted by a shallow shoulder extending about said periphery of the guide drum and being engageable by a longitudinal edge of said tape-like element.

7. A loading device according to claim 1; in which said periphery of the guide drum has a tape lead formed therein for guiding the tape-like element around said guide drum during operation of said apparatus; and further comprising a drum fence protruding from said periphery of the guide drums for guiding the tape-like element during said transporting thereof by the air under pressure and thereafter ensuring the engagement of the tape-like element with said tape lead.

8. A loading device according to claim 1; in which said supply side and take-up side path portions include respective substantially horizontal path sections along which the respective lower wall sections extend, and said means defining the path further includes upper wall sections spaced upwardly from said lower wall sections along said substantially horizontal path sections; and further comprising stationery magnetic head means mounted at one of said substantially horizontal path sections in one of the respective upper and lower wall sections, a shield plate disposed in opposing relation to said head means, and shield plate moving means mounting said shield plate for movement between a first position adjacent said head means with the tape-like element therebetween for shielding magnetic flux issuing from said head means during operation of the apparatus and a second position in which said shield plate is substantially flush with the other of said respective upper and lower wall sections of said one horizontal path section to avoid interference with said transporting of the tape-like element by the air under pressure.

9. A loading device according to claim 8; in which said head means are disposed in shielded casing means opening into said path at said one substantially horizontal path section, and said shield plate, in said first position, is substantially close to the opening of said shielded casing means.

10. A loading device according to claim 8; in which said one of the substantially horizontal path sections at which said magnetic head means and said shield plate are disposed is included in said take-up side path portion.

11. A loading device according to claim 8; in which said shield plate moving means further moves said shield plate to a third position spaced from said head means by a distance greater than that from said head means to said other wall section for facilitating cleaning and maintenance of said head means.

12. A loading device according to claim 1; in which said take-up reel has a hub surface on which the tape-like element is adapted to be wound, and said blower means includes an air inlet opening at said hub surface so that the intake of air at said air inlet will cause a leading end portion of said tape-like element to adhere to said hub surface for winding on said take-up reel after said transporting through said path.

13. A loading device according to claim 1; in which said supply side path portion includes a first substantially horizontal path section extending from said inlet, a first turning path section extending from said first substantially horizontal path section and a second substantially horizontal path section extending from said first turning path section to said peripheral path portion which includes a second turning path section; said take-up side path portion includes a third substantially horizontal path section extending from said second turning path section to said outlet of the path; said plurality of air outlets includes at least a first air outlet provided in said first horizontal path section near said inlet of the tape path, a second air outlet provided in said peripheral path portion near the lowest part thereof, and a third air outlet provided in said third horizontal path section; and said additional air outlet is provided in said second horizontal path section.

14. A loading device according to claim 13; in which said take-up reel has a hub surface on which the tape-like element is adapted to be wound; and in which said blower means includes a first blower operative for supplying said air under pressure to said first, second and third air outlets, and a second blower operative independently of said first blower for supplying said air under pressure to said additional air outlet, said second blower having an air inlet opening at said hub surface so that the intake of air at said air inlet opening will cause a leading end portion of the tape-like element to adhere to said hub surface for winding on said take-up reel after said transporting of the tape-like element through said path.

15. A loading device according to claim 1; in which said supply side path portion includes a first substantially horizontal path section extending from said inlet, a first turning path section extending from said first substantially horizontal path section and a second substantially horizontal path section extending from said first turning path section to said peripheral path portion which includes a second turning path section; and said take-up side path portion includes a third substantially horizontal path section extending from said second turning path section to said outlet of the path; and further comprising tape tension detecting means situated at said first turning path section and being movable between an inoperative position out of said path and an operative position engageable by the tape-like element in said path for detecting a tension in said tape-like element after said transporting thereof through said path.

* * * * *